N. KRIBS.
BATTERY.
APPLICATION FILED JULY 28, 1916.
1,238,529.
Patented Aug. 28, 1917.
2 SHEETS—SHEET 1.
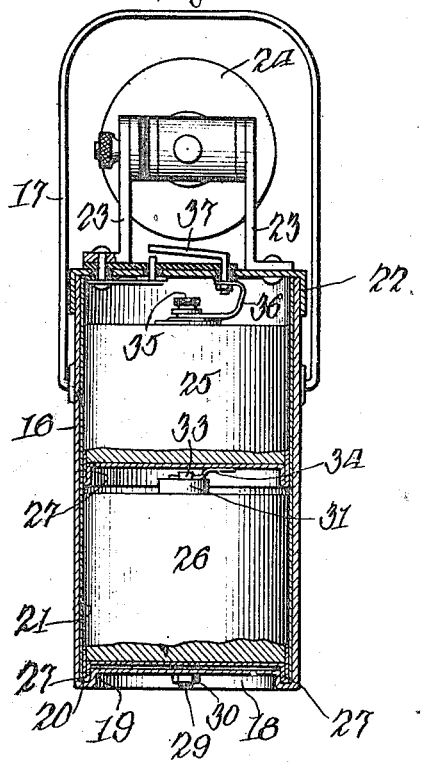
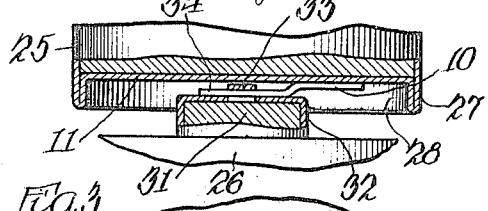
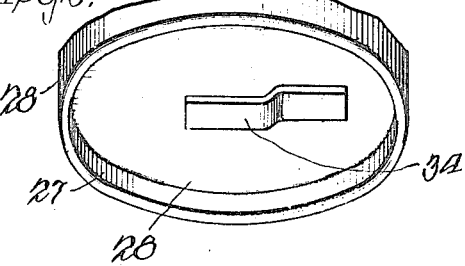
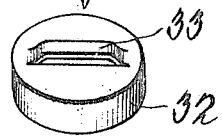
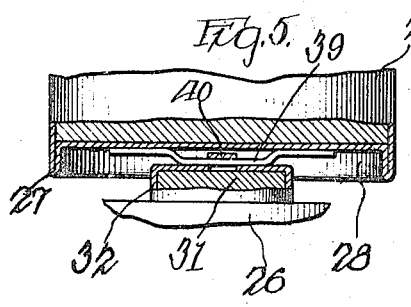
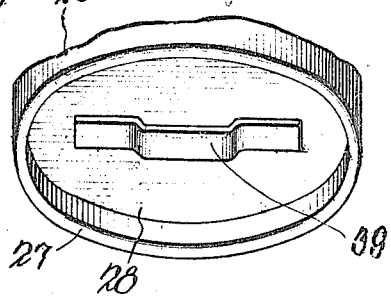
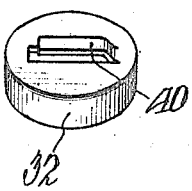
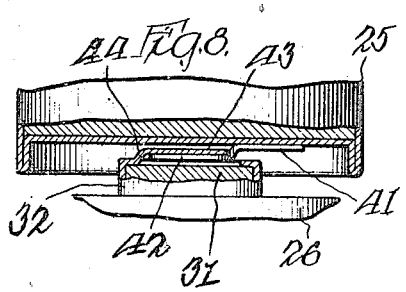
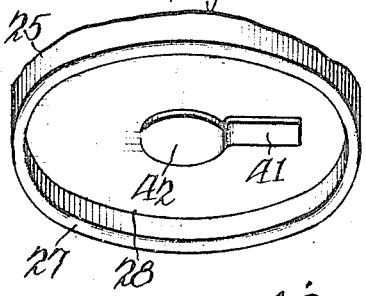
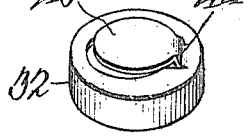
Witness:
Leof Dumais
Inventor:
Nicolas Kribs
By Chas. Q. Tillman Atty.

N. KRIBS.
BATTERY.
APPLICATION FILED JULY 28, 1916.
1,238,529.
Patented Aug. 28, 1917.
2 SHEETS—SHEET 2.
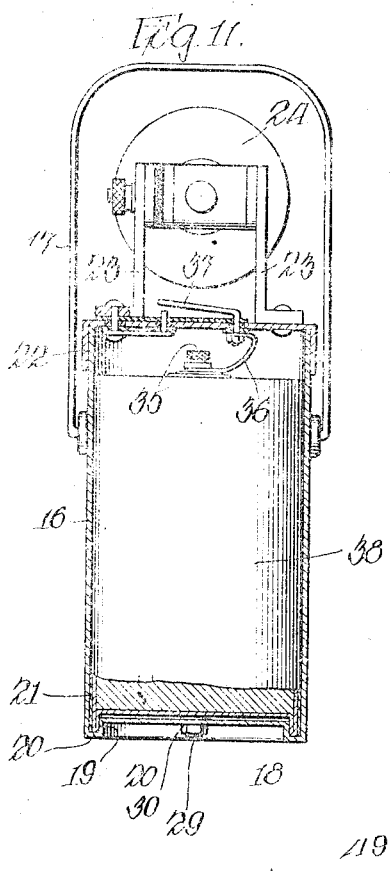
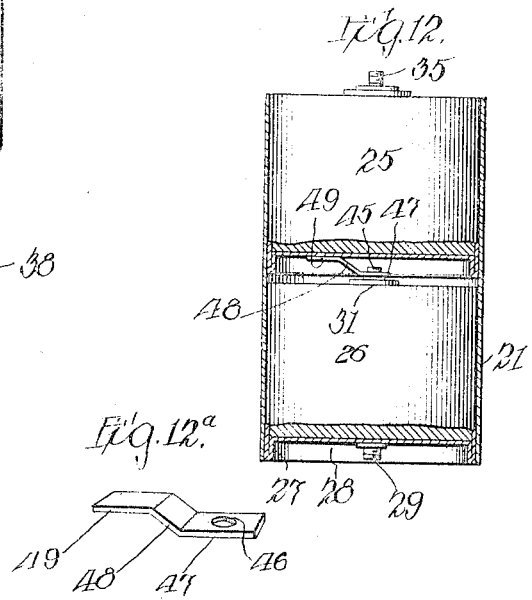
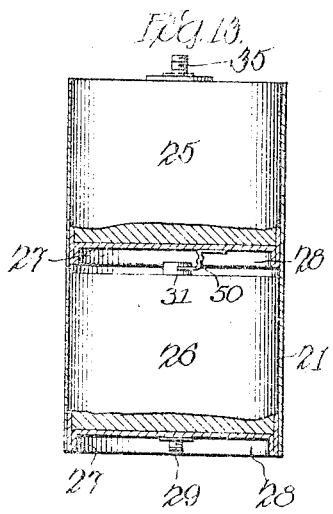
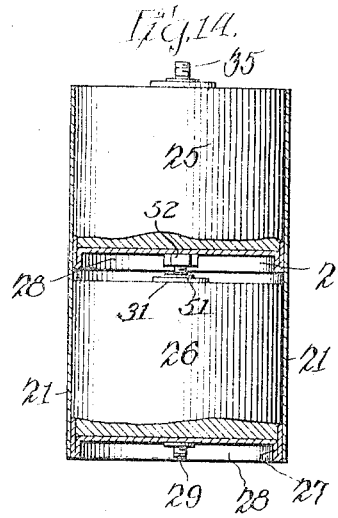
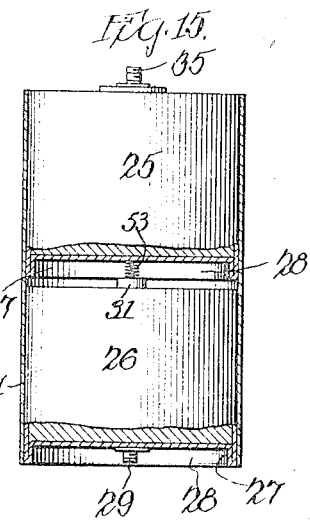
Witness:
Leo J. Dumas
Inventor:
Nicolas Kribs
By Chas. C. Tillman, Atty

UNITED STATES PATENT OFFICE.

NICOLAS KRIBS, OF DUNDEE, ILLINOIS.

BATTERY.

1,238,529.   Specification of Letters Patent.   Patented Aug. 28, 1917.

Application filed July 28, 1916. Serial No. 111,764.

*To all whom it may concern:*

Be it known that I, NICOLAS KRIBS, a citizen of the United States, residing at Dundee, in the county of Kane and State of Illinois, have invented certain new and useful Improvements in Batteries, of which the following is a specification.

My present invention relates to improvements in batteries, and appertains particularly to batteries of the dry-cell type, but is applicable to other types of batteries, and it consists in certain peculiarities of the construction, novel arrangement and operation of the various parts thereof, as will be hereinafter more fully set forth and specifically claimed.

The main object of this invention, is to provide a battery, which is especially designed for use in battery lamp containers, such as are disclosed in Patent No. 1,168,892, issued to me on January 18, 1916, for improvements in a battery lamp, and in battery containers disclosed in my application for patent Serial No. 72,215, filed January 15, 1916, for improvements in a battery lamp, but it will be understood from the following explanation, disclosures, and by referring to the drawings accompanying this application, that my invention relates to improvements in batteries, whether the same are designed for use for lamps or lanterns of the above mentioned or portable type or for gas engine ignition, or other purposes for which it is applicable.

While the principal object of my present invention, is to provide or furnish improvements in dry-cell batteries and containers therefor, the containers being those of portable lamps or lanterns, such as above referred to with reference to my aforesaid patent and application yet I wish it distinctly understood, that I do not desire to limit myself, in any way, to the application or utilization of my invention but may employ it anywhere in connection with any device or devices that it may be found practical or desirable for use.

Another object of the invention is to provide simple and positive means for connecting the battery to the lamp container, or containers therefor. Still another object is to furnish simple and positive means for connecting two or more battery cells together in such a manner as to increase the voltage and light in a lamp, or for any other purposes.

Still another object of the invention, is to provide means for connecting a plurality of dry-cells in series, to obtain an increase of voltage, within the space occupied by a single dry-cell and in such a manner that the cells will be effectively and electrically secured together, so that they can be readily placed in or removed from a carton or casing, as a unit, and so that they will not be disconnected by jarring, shocks, or vibrations. Still another object of the invention, is to furnish means for firmly or rigidly and electrically (if desired,) connecting one of the cells to a container, to the end, that the cells will always be held in positive contact with one another and prevent displacement with respect to the container.

Other objects and advantages of the invention will be disclosed in the sub-joined description and explanation.

In the accompanying drawings which serve to illustrate an embodiment of the invention, Figure 1, is a vertical sectional view of a lamp or lantern container similar to that shown in Fig. 2, of the above mentioned patent, showing a pair of dry-cells located in said container and connected together and secured to the container by means embodying one form of the invention.

Fig. 2, is an enlarged fragmental view partly in section and partly in elevation of the lower portion of the upper cell and the upper part of the lower cell showing the means for connecting the adjacent portions of said cells together.

Fig. 3, is a fragmental perspective view, slightly enlarged, of the bottom of the upper cell showing means thereon to engage means on the upper portion of the lower cell to unite the same. Fig. 4, is a detached perspective view of the cap for the carbon post on the upper end of the lower cell.

Fig. 5, is a similar view of like parts to that shown in Fig. 2, but illustrating a modification in the means for connecting the adjacent ends of the upper and lower cells together. Fig. 6, is a fragmental perspective view of the bottom of the upper cell showing the modified construction of the engaging means thereon.

Fig. 7, is a detached perspective view of the cap for the carbon post of the upper portion of the lower cell showing the modified means for engaging the engaging means on the bottom of the upper cell.

Fig. 8, is a similar view of like parts to that shown in Fig. 2, but illustrating another modification in the means for connecting the adjacent ends of the upper and lower cells together.

Fig. 9, is a fragmental bottom perspective view of the upper cell showing the modified engaging means thereon, illustrated in Fig. 8.

Fig. 10, is a detached perspective view of the carbon post cap used in the last named modified construction, illustrating the engaging means thereon for coöperation with the means on the bottom of the upper cell in the last modified form.

Fig. 11, is a vertical sectional view through a lamp or lantern container showing a single cell therein and illustrating means for securing said cell to the container.

Fig. 12, is a view partly in section and partly in elevation of battery cells surrounded by a carton and illustrating another modification in the means for connecting said cells together so as to form a unit, and also illustrating means for securing the lower cell to a container therefor.

Fig. 12ᵃ is a detached perspective view of a securing member or nut used on one of the battery cells as shown in Fig. 12, for receiving the screw threaded projection mounted on the upper portion of the carbon of the lower cell.

Figs. 13 to 15 inclusive, are views partly in section and partly in elevation of battery cells illustrating modified means in the manner of connecting said cells together so as to form units, and also illustrating means for securing the lower cell of each unit to a container therefor.

Like numerals of reference, refer to like parts throughout the different views of the drawings.

Referring now to Figs. 1 to 4 inclusive, of the drawings, the reference numeral 16, designates the container for the battery cells, which container is, by preference cylindrical in shape, as are said cells, and is made of metal, and as herein shown, may be equipped with a bail or handle 17, to enable it to be carried or handled as a lamp, the novel features of which lamp are described and claimed in the above mentioned patent and application for patent, and will not herein be referred to, except, in so far as need be necessary to for a clear description of my present invention. The lower end of the container 16, is permanently closed and is provided with a cavity or depression 18, that is to say the lower end of the container is upwardly or inwardly depressed in such a way as to form an internal channel between the inner wall of said depressed portion and the lower extremity of the wall of the container, thus forming an annular groove 20, for the reception of the lower end of the carton 21, and the lower end of the lowermost battery cell, when more than one cell is employed.

The upper end of the container may be closed by means of the cap 22, which is snugly fitted to said upper end. Mounted on the upper surface of the cap, when the container is used as a lamp, are a pair of uprights 23, which support the lamp casing 24, in the manner and by the mechanism set forth in my said patent and my said application for patent. Referring now to Figs. 1 to 3 inclusive, of the drawings, it will be seen and understood that the container 16, has located therein, one above the other, two super-posed cells 25 and 26, which may be of the ordinary 1½ voltage type and construction, except that the lower end of each cell, but more particularly the lower cell is provided with an annular and outwardly extending rim or flange 27 thus forming an upwardly extending depression 28 of a size and shape to correspond with and to fit on the upper surface of the depression 18, in the container. By so constructing the cells 25 and 26, especially the latter, it is obvious that the annular flange 27 will fit in the groove 20, between the wall of the depression and the lower extremity of the wall of the container 16, and that the said flange 27 of the cell 25, will be located at a distance from the upper end of the cell 26, between which cells insulating material may be interposed but the same is not shown. The cells 25 and 26 may be surrounded or enveloped in a carton 21 in the shown manner, but a portion of the carton 21, for said cells is removed to expose the zinc bottom of the lower cell, to the end, that the electric connection may be easily and effectively made between the bottom of the lower cell 26 and the bottom of the container.

In order to effect the aforesaid connections the zinc bottom of the lower cell is provided centrally with a depending screw-threaded stud 29, which is extended through a suitable center opening in the bottom of the container 16, and has mounted on its lower portion a nut 30, which, when tightened up on the stud 29 will firmly hold the lower cell in contact with the bottom of the container and snugly within the walls of the latter.

The carbon 31 of the lower cell is provided with a metal cap 32 having a loop 33, or strap, extended upwardly from its upper portion as is clearly shown in Figs. 1, 2 and 4 of the drawings. This loop or strap is by preference "upset" or punched from the cap 32 yet is integral therewith, or preferably so. The bottom of the cell 25, is provided with an engaging member 34 which is located at a right angle to the member or loop 33, and has one of its ends free from the said bottom while its other end is secured thereto as will be readily understood by reference to Figs. 2 and 3 of the drawings. By this arrangement it is obvious that the free end of the strap or member 34 can be inserted between the loop 33, and top of the cap 32, before the carton 21 is placed around said cells, and that by means of the engaging members 33 and 34 the adjacent ends of said cells will be securely connected together so that they can be handled as a unit. The member or strap 34 is made of metal and is connected to the zinc bottom of the cell 25 outwardly of the center thereof as shown. Leading from the binding post 35 of the upper part of the cell 25 is a conductor 36 which is connected to one end of a switch 37, which is insulated from the cap or cover 22, but mounted thereon, as is clearly shown in Figs. 1 and 11 of the drawings, when the container is used in connection with a lamp. When the container is equipped with one cell only as shown in Fig. 11, of the drawings the above mentioned connections between the switch 37 and carbon of a single cell will be employed. When a single cell is used in the container, the construction of the single cell 38 is the same at its bottom as that of the cell 26 shown in Fig. 1 and above described.

In Figs. 5 to 7 inclusive, I have shown a modification in the construction of the engaging means for the adjacent ends of the cells, which consists in securing diametrically to the zinc bottom of the upper cell 25 a metal strap 39, which has its central portion extended from the said bottom in order to receive the projection 40, with which the cap 32 on the carbon 31 of the lower cell 26 is provided. As shown in Fig. 7 the projection 40 on the cap 32 is "upset" or punched therefrom and has one of its ends free while its other end is connected to said cap outwardly. By this arrangement it is obvious that the projection 40 can be interposed between the bottom of the cell 25 and the strap 39 thereon before the carton 21 is placed around the said cells, if said carton is used, and that the cells will be thereby securely connected together so as to permit them to be handled as a unit.

In Figs. 8 to 10 inclusive, I have shown still another modified means for connecting the adjacent ends of the cells together, which consists in providing the zinc bottom of the cell 25 or upper cell with a metal strap 41 which is soldered or otherwise secured to said bottom and has a free and circular member 42 located at a distance from the bottom of the cell 25, as is clearly shown in Fig. 8 of the drawings. The cap 32 on the carbon of the lower cell 26 in the modified construction now under consideration, is provided with an engaging member 43 which is also circular in shape and connected at its edge as at 44, to the upper surface of said cap outwardly from the center thereof. The member 43, is by preference "upset" or punched out of the top of the cap 32 so as to be mainly free therefrom but integrally connected thereto. By employing the construction of the present modification it is manifest that the parts 42 and 43 will overlie one another, yet in contact and so that there will be some resiliency between the engaging members to the end that the cells will be securely connected together at their adjacent ends. This arrangement will permit of considerable shifting of the cells without breaking their electric connection, as is apparent.

In Figs. 12 and 12ª I have illustrated another modified form in the means for connecting the adjacent ends of the super-posed cells 25 and 26 together, which consists in providing the carbon 31, of the lower cell with a screw-threaded projection 45 to engage an opening 46 in a member 47 which member is made of metal, and is secured to the zinc bottom of the cell 25 outwardly of the center thereof, but so that the opening of said member will be located centrally with respect to said cell bottom. It will be observed by referring to the last mentioned figures of the drawings, that the member 47, is provided with an offset or shoulder 48 and an extension 49, which extension may be secured to the bottom of the cell 25 by means of solder or otherwise.

As my improved battery is adaptable for uses other than for portable lamps, I have shown in Figs. 12, 13, 14, and 15, portions of cells of a battery with no container therefor, and have illustrated in Fig. 13 another form or means for uniting a plurality of cells, in Fig. 14, a plurality of cells, in another manner, and in Fig. 15, a plurality of cells in another manner, in each of which figures, as well as, in Fig. 12, is also illustrated means for connecting the lower cell to a container or support. In the construction illustrated in Figs. 12 to 15, the bottom of the cell 26 is constructed in the same manner as the cells 26 and 38 shown in Figs. 1 and 11, and above described, that is, said cell has in its bottom a centrally located screw-threaded stud 29, to engage a nut or support, not shown.

In Fig. 13, the modification consists in employing a spring or resilient connection 50, which is connected at one of its ends to the bottom of the cell 25, and at its other end to the carbon 31, on the upper portion of the lower cell.

The modification shown in Fig. 14, consists in a screw-threaded stud 51 which is secured at one of its ends to the cap 32 of the carbon 31, on the upper portion of the lower cell and engages at its other end a nut 52 on the bottom of the cell 25, located adjacent thereto.

In Fig. 15, the modification consists in employing a spiral spring 53 which is secured at one of its ends to the cap 32 of the carbon 31 on the upper portion of the lower cell, and at its other end to the bottom of the cell 25.

From the foregoing and by reference to the drawings it will be readily understood and clearly seen that my present improvements afford means for uniting a plurality of cells one with the other so that they may be handled or placed in a container as a unit, and also in such a manner that when they have been placed in the container, they will be firmly secured therein, so as to withstand shocks, jars, in shipment, or handling thereof, as well as, to the end, that their connections will not be broken or disarranged by vibrations to which the battery may be subjected, especially if the same is used for gas engine ignition on automobiles, motor-boats, and for like purposes.

Having thus fully described my invention, what I claim as new and desire to secure by Letters Patent is—

1. The combination with a plurality of super-posed dry-cells, a screw-threaded projection on the carbon pole at the upper end of each cell, a screw-threaded projection fixed centrally on the bottom of the lowermost cell, a nut having a screw-threaded opening and fixed on the bottom of the super-posed cells to receive the screw-threaded projection on the cell adjacent thereto, a binding post connected to the carbon pole of the top cell, a container for said cells having electric conducting means and provided with a central opening in its bottom for the reception of the stud on the bottom of the lowermost cell, and means on said stud externally of the bottom of the container to clamp the bottom of the container against the bottom of the lowermost cell.

2. The combination with a plurality of super-posed dry-cells, each of said cells having on its lower end a peripheral and downwardly extended flange forming a circular and upwardly extended cavity, of an electric conducting screw-threaded projection fixed on the carbon pole of each of said cells, a nut having a screw-threaded opening and fixed on the bottom of the super-posed cells to engage the aforesaid projections, a container for said cells having electric conducting means and provided with an upwardly depressed bottom having a central opening therein for the reception of the projection on the bottom of the lower-most cell, the peripheral wall of said depression being located concentrically with respect to the lower extremity of the wall of the container thus forming an annular groove for the reception of the flange on the lower end of the lower-most battery cell, and a nut located on said projection of the lower-most cell externally of the bottom of the container to clamp the bottom of the latter against the bottom of the lowermost cell.

3. The combination with a plurality of super-posed dry-cells, each of said cells having on its lower end a peripheral and downwardly extended flange forming a circular and upwardly extended cavity, of an electric conducting screw-threaded projection centrally located on the bottom of the lower-most cell, an interlocking electric conducting member on the carbon pole of at least one of said cells, an interlocking electric conducting member on the bottom of at least one of the super-posed cells, a container for said cells having electric conducting means and provided with an upwardly depressed bottom having a central opening therein for the reception of the projection on the bottom of the lowermost cell, the peripheral wall of said depression being located concentrically with respect to the lower extremity of the wall of the container and spaced therefrom thus forming an annular groove for the reception of the flange on the lower end of the lowermost cell, a nut located on the said projection of the lowermost cell externally of the bottom of the container to clamp the bottom of the latter toward the bottom of the lowermost cell.

4. The combination with a plurality of super-posed dry-cells, each of said cells having on its lower end a peripheral and downwardly extended flange forming a circular and upwardly extended cavity, of an electric conducting screw-threaded projection centrally fixed on the bottom of the lower-most cell, an interlocking conducting member on the carbon pole of at least one of said cells, an interlocking member on the bottom of at least one of the super-posed cells, said interlocking members being fixed to their respective cells but adapted for detachable engagement with one another.

NICOLAS KRIBS.

Witnesses:
CHAS. C. WOLAVER,
CHAS. C. TILLMAN.